United States Patent
Watarai et al.

(10) Patent No.: US 8,007,383 B2
(45) Date of Patent: Aug. 30, 2011

(54) LOW PROFILE REAR DERAILLEUR

(75) Inventors: Etsuyoshi Watarai, Izumi (JP); Shinya Oseto, Sakai (JP); Souta Yamaguchi, Sakai (JP)

(73) Assignee: Shimano, Inc., Sakai-ku, Sakai (JP)

( * ) Notice: Subject to any disclaimer, the term of this patent is extended or adjusted under 35 U.S.C. 154(b) by 0 days.

(21) Appl. No.: 11/963,712

(22) Filed: Dec. 21, 2007

(65) Prior Publication Data

US 2008/0103000 A1  May 1, 2008

Related U.S. Application Data

(62) Division of application No. 11/552,291, filed on Oct. 24, 2006.

(51) Int. Cl.
*F16H 9/00* (2006.01)
(52) U.S. Cl. .............. 474/82; 474/81; 474/116
(58) Field of Classification Search ........... 474/80, 474/82, 83, 78, 81, 116
See application file for complete search history.

(56) References Cited

U.S. PATENT DOCUMENTS

| | | | |
|---|---|---|---|
| 534,680 A | 2/1895 | Bolte | |
| 2,507,416 A | 5/1950 | Needham | |
| 3,364,762 A | 1/1968 | Maeda | |
| 3,535,950 A | 10/1970 | Shimano et al. | |
| 3,677,103 A | 7/1972 | Huret et al. | |
| 3,702,080 A | 11/1972 | Huret et al. | |
| 3,803,933 A | 4/1974 | Huret et al. | |
| 3,979,962 A | 9/1976 | Kebsch | |
| 4,061,048 A | 12/1977 | Huret et al. | |
| 4,226,131 A | 10/1980 | Yamasaki | |
| 4,269,601 A | 5/1981 | Nagano | |
| 4,277,077 A | 7/1981 | Ozaki | |
| 4,286,953 A | 9/1981 | Shimano | |
| 4,306,871 A | 12/1981 | Nagano | |
| 4,406,643 A | 9/1983 | Shimano | |
| 4,437,848 A | 3/1984 | Shimano | |
| 4,443,208 A | 4/1984 | Kozakae | |
| 4,470,823 A | 9/1984 | Shimano | |
| 4,530,677 A | 7/1985 | Nagano | |

(Continued)

FOREIGN PATENT DOCUMENTS

BE  425459 A  12/1937

(Continued)

OTHER PUBLICATIONS

European search report for EP 06004024.3, now published as EP 1826114 A1, the European application that corresponds to original claims 1-35 of related U.S. Appl. No. 11/307,941, dated Jun. 14, 2006.

(Continued)

*Primary Examiner* — Bradley T King
*Assistant Examiner* — Thomas Irvin
(74) *Attorney, Agent, or Firm* — James A. Deland

(57) ABSTRACT

A bicycle rear derailleur comprises a base member, a movable member that supports a chain guide including a pulley that rotates around a pulley axis, and a linking member coupled between the base member and the movable member so that the chain guide moves laterally relative to the base member between a first lateral position and a second lateral position. Examples of features include the linking member being coupled to the base member through separate pivot pins, the linking member straddling the base member, and the base member having link coupling projections with different thicknesses.

119 Claims, 15 Drawing Sheets

U.S. PATENT DOCUMENTS

| | | | |
|---|---|---|---|
| 4,552,546 | A | 11/1985 | Ishikawa |
| RE32,059 | E | 12/1985 | Nagano |
| 4,637,808 | A | 1/1987 | Nakamura |
| 4,734,084 | A | 3/1988 | Nagano |
| 4,758,205 | A | 7/1988 | Durham |
| 4,789,379 | A | 12/1988 | Ozaki et al. |
| 4,838,837 | A | 6/1989 | Testa |
| 5,163,881 | A | 11/1992 | Chattin |
| 5,238,458 | A | 8/1993 | Ishibashi |
| 5,295,916 | A | 3/1994 | Chattin |
| 5,346,434 | A | 9/1994 | Hsu |
| 5,380,252 | A | 1/1995 | Iwasaki et al. |
| 5,380,253 | A | 1/1995 | Iwasaki |
| 5,445,567 | A | 8/1995 | Chattin |
| 5,456,637 | A | 10/1995 | Chang |
| 5,518,456 | A | 5/1996 | Kojima et al. |
| 5,597,366 | A | 1/1997 | Ozaki |
| 5,618,241 | A | 4/1997 | Ose |
| 5,624,334 | A | 4/1997 | Lumpkin |
| 5,688,200 | A | 11/1997 | White |
| 5,779,580 | A | 7/1998 | White et al. |
| 5,855,529 | A | 1/1999 | Sugimoto |
| 5,857,932 | A | 1/1999 | Sugimoto |
| 5,904,629 | A | 5/1999 | Oka |
| 6,015,360 | A | 1/2000 | Chang |
| 6,030,307 | A | 2/2000 | Oka |
| 6,135,905 | A | 10/2000 | Soon |
| 6,287,228 | B1 | 9/2001 | Ichida |
| 6,325,733 | B1 | 12/2001 | Patterson et al. |
| 6,354,971 | B1 | 3/2002 | Howell et al. |
| 6,419,602 | B1 | 7/2002 | Soon |
| 6,692,389 | B2 | 2/2004 | Yin |
| 6,793,598 | B1 | 9/2004 | Savard |
| 7,014,584 | B2 | 3/2006 | Nanko et al. |
| 7,104,908 | B2 | 9/2006 | Nagano |
| 7,396,304 | B2 | 7/2008 | Shahana |
| 2004/0106482 | A1 | 6/2004 | Nagano |
| 2004/0116222 | A1 | 6/2004 | Shahana et al. |
| 2004/0254038 | A1 | 12/2004 | Chamberlain et al. |
| 2005/0176537 | A1 | 8/2005 | Matsumoto et al. |
| 2005/0187048 | A1 | 8/2005 | Fukuda |
| 2005/0192138 | A1 | 9/2005 | Sze et al. |
| 2005/0215368 | A1 | 9/2005 | Hoe |
| 2007/0021246 | A1 | 1/2007 | Shahana et al. |
| 2007/0202977 | A1 | 8/2007 | Watarai et al. |
| 2007/0202978 | A1 | 8/2007 | Yamaguchi et al. |
| 2008/0064544 | A1 | 3/2008 | Yamaguchi et al. |
| 2008/0064545 | A1* | 3/2008 | Yamaguchi ............... 474/82 |

FOREIGN PATENT DOCUMENTS

| | | | |
|---|---|---|---|
| CH | 284668 | A | 11/1952 |
| CN | 1133806 | A | 10/1996 |
| DE | 4022473 | A1 | 1/1992 |
| DE | 9422229 | U1 | 5/1999 |
| DE | 19915334 | A1 | 10/2000 |
| EP | 32049 | A2 | 12/1980 |
| EP | 0513394 | A1 | 11/1992 |
| EP | 542077 | A1 | 5/1993 |
| EP | 655386 | A1 | 5/1995 |
| EP | 718185 | A2 | 6/1996 |
| EP | 1010612 | A1 | 6/2000 |
| EP | 1099620 | A2 | 5/2001 |
| EP | 1475300 | A2 | 11/2004 |
| EP | 1671881 | A2 | 6/2006 |
| EP | 1764297 | A1 | 3/2007 |
| FR | 760565 | A | 2/1934 |
| FR | 799947 | A | 6/1936 |
| FR | 869777 | | 2/1942 |
| FR | 922775 | A | 6/1947 |
| FR | 1000094 | | 2/1952 |
| JP | 50-47153 | A | 5/1975 |
| JP | 54-9853 | A | 1/1979 |
| JP | 54-47247 | A | 4/1979 |
| JP | 54-47248 | A | 4/1979 |
| JP | 54-57736 | A | 5/1979 |
| JP | 54-72831 | A | 6/1979 |
| JP | 55-29695 | A | 3/1980 |
| JP | 55-127272 | A | 10/1980 |
| JP | 55-140678 | A | 11/1980 |
| JP | 55-148676 | A | 11/1980 |
| JP | 62-99291 | A | 5/1987 |
| JP | 8-169387 | A | 7/1996 |
| WO | 92-10395 | A1 | 6/1992 |

OTHER PUBLICATIONS

European search report for EP 06022723.8, now published as EP 1829780 A1, the European application that corresponds to original claims 47-67 of related U.S. Appl. No. 11/307,941, dated Jul. 30, 2007.

European search report for EP 06026059.3, now published as EP 1826115 A2, the European application that is equivalent to U.S. Appl. No. 11/423,247, an application related to this application, dated Dec. 14, 2007.

European search report for EP 06026059.3, now published as EP 1826115 A2, the European application that is equivalent to U.S. Appl. No. 11/423,247, an application related to this application, dated Feb. 13, 2008.

European search report for EP 07007210.3, now published as EP 1916183 A2, the European application that is equivalent to U.S. Appl. No. 11/552,291, an application that is the parent of this application, dated Apr. 16, 2008.

European search report for EP 08161785.4, now published as EP 2000399 A1, the European application that corresponds to original claims 36-46 of related application U.S. Appl. No. 11/307,941, dated Oct. 14, 2008.

Taiwanese office action and search report for TW 095137042, the Taiwanese application that corresponds to co-pending related U.S. Appl. No. 11/423,247, dated Feb. 16, 2009.

Taiwanese office action and search report for TW 095132098, the Taiwanese application that corresponds to co-pending related U.S. Appl. No. 11/307,941, dated Feb. 18, 2009.

European Search Report and office action for EP 07022964.6, the European application that corresponds to co-pending related U.S. Appl. No. 11/747,460, dated Jun. 2, 2009.

European Search Report and office action dated Jun. 17, 2009, for EP 09154602.8, a divisional of EP 06026059.3, now published as EP 1826115 A2. EP 1826115 A2 is the European application that corresponds to co-pending related U.S. Appl. No. 11/423,247.

European Search Report for EP 08003740.1 (now published as EP 1939085 A2), dated Aug. 14, 2009. EP 1939085 is the European application that corresponds to claims 1-45 of this application.

EPO office action dated Jun. 28, 2010 for EP 07007210.3, the EP application that corresponds to co-pending U.S. Appl. No. 11/552,291, the parent of this application.

Winkler, et al.; "Fahrradtechnik," pp. 1,2 and 269, published in 1989 by Bielefelder Verlagsanstalt KG in Germany.

Notice of Opposition filed Mar. 9, 2011 against EP 1826114 B1, the European patent that pertains to claims 1-46, 71-83 and 93 of co-pending related U.S. Appl. No. 11/307,941.

* cited by examiner

LOW PROFILE REAR DERAILLEUR

CROSS REFERENCE TO RELATED APPLICATIONS

This application is a division of copending application Ser. No. 11/552,291, filed Oct. 24, 2006.

BACKGROUND OF THE INVENTION

The present invention is directed to bicycles and, more particularly, to a low profile rear derailleur used to switch a chain among a plurality of sprockets that rotate with the rear wheel.

A bicycle rear derailleur is used to selectively engage a chain with one of a plurality of sprockets that rotate with the rear wheel of the bicycle. A typical rear derailleur comprises a base member, a movable member supporting a chain guide, and a linking mechanism coupled between the base member and the movable member so that the chain guide moves laterally relative to the base member. The base member usually is mounted to the rear end of the bicycle frame by a mounting bolt that screws into a threaded opening formed in the frame. Because of the nature of the lateral movement of the chain guide required to switch the chain among the sprockets, the linking mechanism, the movable member and the chain guide all protrude laterally outward by a significant distance, especially when the chain is engaged with the laterally outermost rear sprocket. As a result, the chain guide is susceptible to striking or becoming entangled with nearby objects, especially when riding off-road in mountainous terrain. The effect becomes more severe as the number of sprockets increase.

SUMMARY OF THE INVENTION

The present invention is directed to various features of a bicycle rear derailleur. In one embodiment, a bicycle rear derailleur comprises a base member, a movable member that supports a chain guide including a pulley that rotates around a pulley axis, a first linking member coupled between the base member and the movable member so that the chain guide moves laterally relative to the base member between a first lateral position and a second lateral position, a first pivot shaft that couples the first linking member to the base member, and a separate second pivot shaft that couples the first linking member to the base member.

In another embodiment, a bicycle derailleur comprises a base member, a movable member that supports a chain guide including a pulley that rotates around a pulley axis, and a first linking member coupled between the base member and the movable member so that the chain guide moves laterally relative to the base member between a first lateral position and a second lateral position. The base member comprises a mounting portion and a link coupling portion, wherein the mounting portion mounts the base member to a bicycle frame, and the link coupling portion couples the first linking member to the mounting portion. The link coupling portion comprises a laterally inner link mounting projection and a laterally outer link mounting projection, wherein the laterally inner link mounting projection includes a laterally inwardly facing surface and a laterally outwardly facing surface, and the laterally outer link mounting projection includes a laterally inwardly facing surface and a laterally outwardly facing surface. The first linking member comprises a first coupling projection and a second coupling projection, wherein the first coupling projection is disposed at the laterally inwardly facing surface of the laterally inner link mounting projection, and the second coupling projection is disposed at the laterally outwardly facing surface of the laterally outer link mounting projection.

In another embodiment, a bicycle derailleur comprises a base member, a movable member that supports a chain guide including a pulley that rotates around a pulley axis, and a first linking member coupled between the base member and the movable member so that the chain guide moves laterally relative to the base member between a first lateral position and a second lateral position. The base member comprises a mounting portion and a link coupling portion, wherein the mounting portion mounts the base member to a bicycle frame, and the link coupling portion couples the first linking member to the mounting portion. The link coupling portion comprises a laterally inner link mounting projection and a laterally outer link mounting projection, wherein the laterally inner link mounting projection includes a laterally inwardly facing surface and a laterally outwardly facing surface, and the laterally outer link mounting projection includes a laterally inwardly facing surface and a laterally outwardly facing surface. The first linking member pivots relative to the base member around a common axis that extends through the laterally inner link mounting projection and through the laterally outer link mounting projection. A thickness between the laterally inwardly facing surface and the laterally outwardly facing surface of one of the inner link mounting projection or the laterally outer link mounting projection at the common axis is greater than a thickness between the laterally inwardly facing surface and the laterally outwardly facing surface of the other one of the inner link mounting projection or the laterally outer link mounting projection at the common axis.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
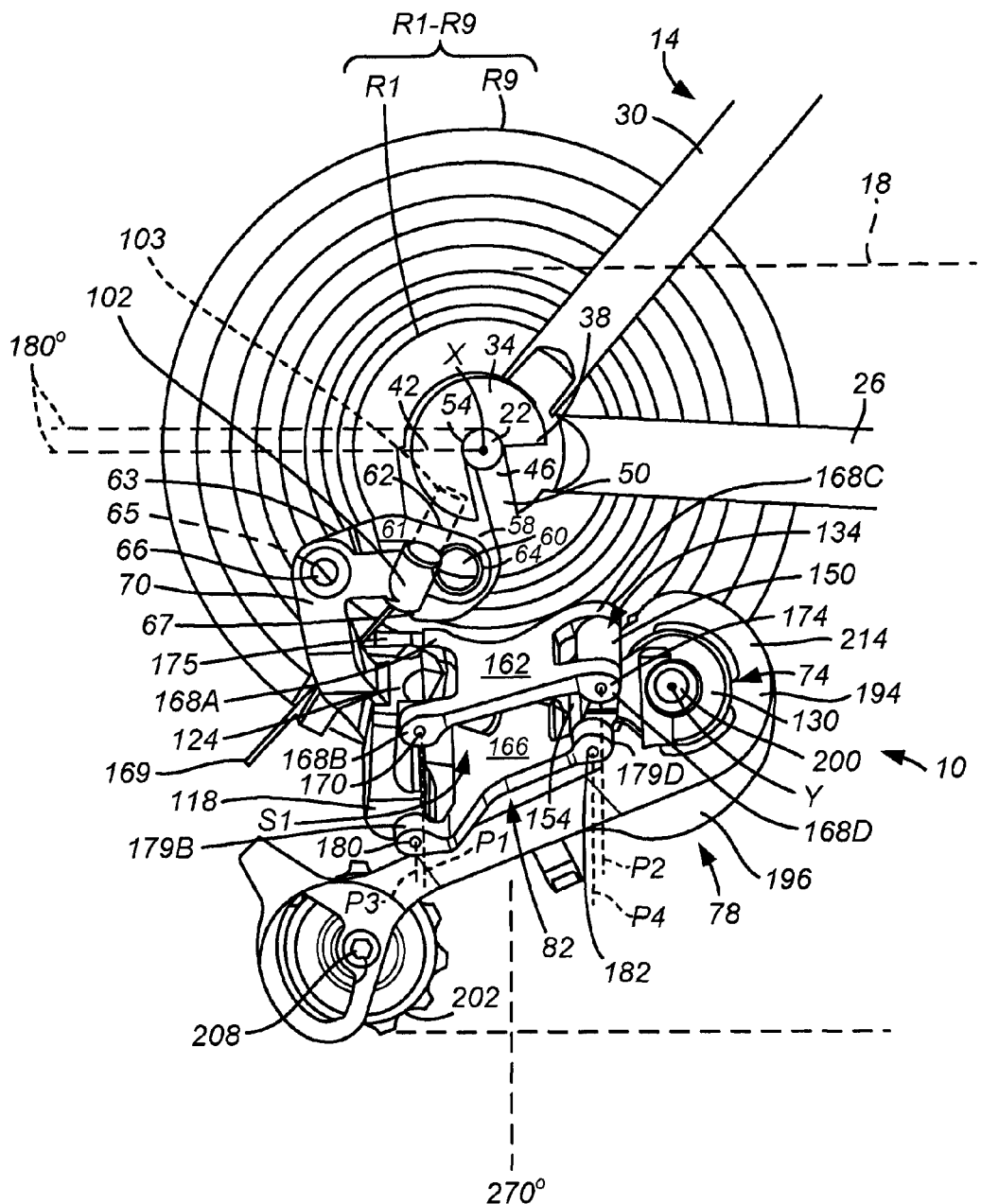
FIG. 1 is a laterally outer view of a particular embodiment of a rear derailleur in a middle speed position.
Figure 2:
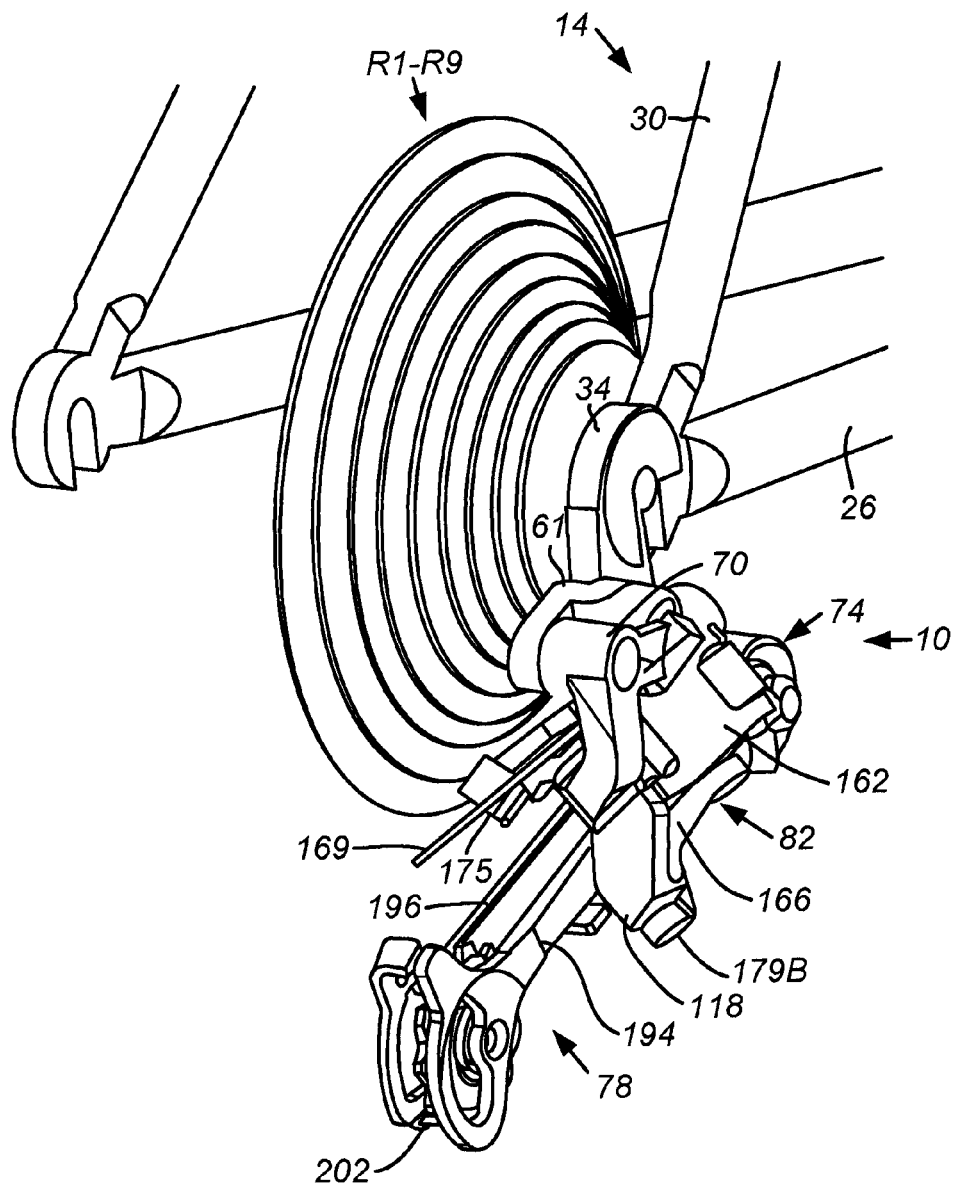
FIG. 2 is a rear oblique view of the derailleur in the middle speed position.
Figure 3:
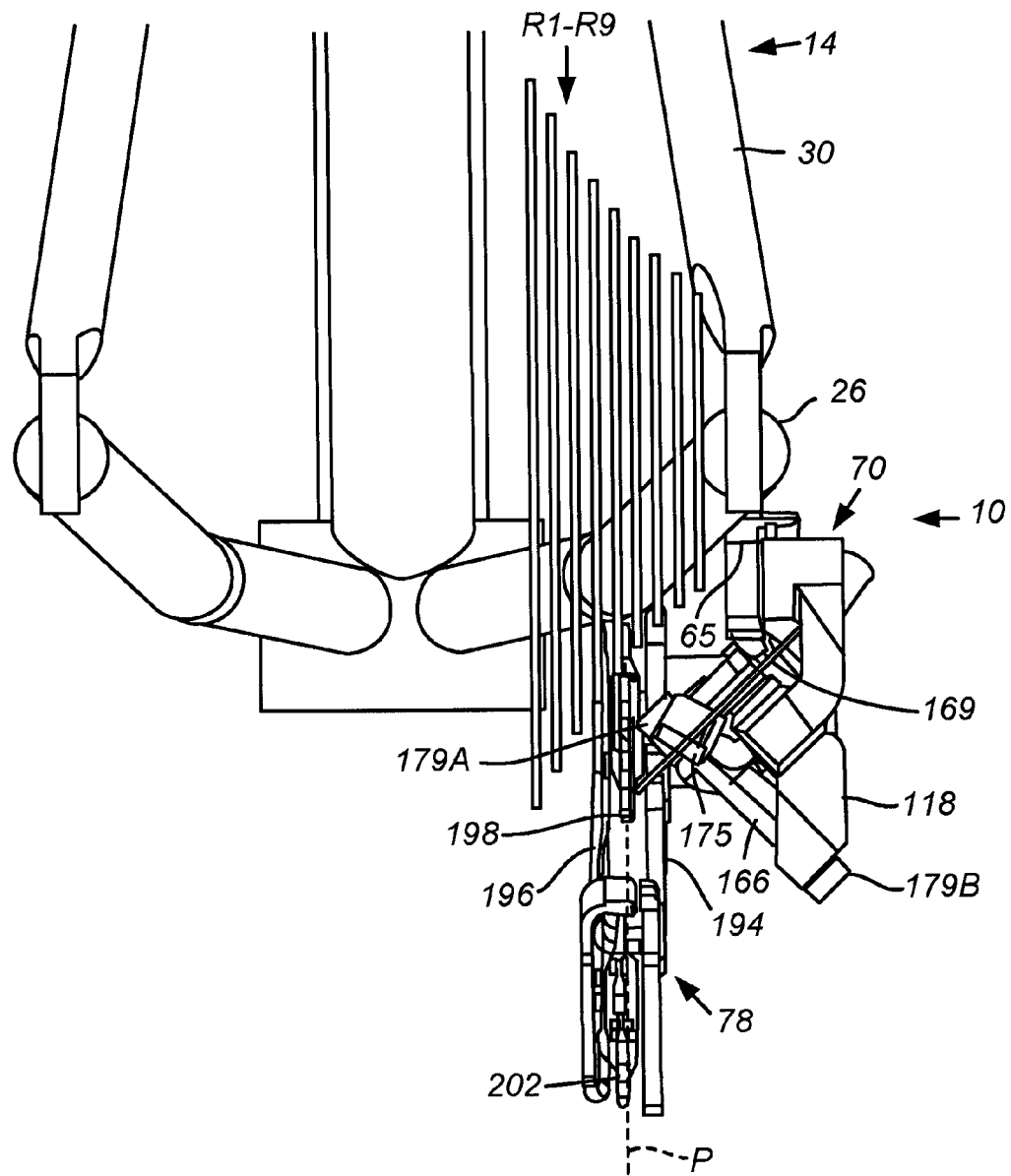
FIG. 3 is a rear view of the derailleur in the middle speed position.

FIG. 1 is a laterally outer view of a particular embodiment of a rear derailleur 10 in a middle speed position, FIG. 2 is a rear oblique view of derailleur 10, and FIG. 3 is a rear view of derailleur 10. As shown in FIG. 1, rear derailleur 10 is mounted to the rear portion of a bicycle frame 14 for guiding a chain 18 among a plurality of rear sprockets R1-R9 that rotate coaxially around a rear wheel axle 22 supported to frame 14, wherein axle 22 defines a rotational axis X.

Bicycle frame 14 is part of an overall bicycle frame that includes a chain stay 26, a seat stay 30 and a frame end 34 (commonly referred to as a dropout) that joins chain stay 26 and seat stay 26 together, typically by welding chain stay 26 and seat stay 30 to frame end 34. Conceptually, each of these frame structures is well known. In this embodiment, frame end 34 comprises a forward portion 38 and a rearward portion 42, wherein forward portion 38 extends from chain stay 26 and seat stay 30 to a horizontal position aligned with rotational axis X, and rearward portion 42 extends from a horizontal position aligned with rotational axis X rearwardly and substantially vertically downwardly. A junction between forward portion 38 and rearward portion 42 forms an axle receiving slot 46 dimensioned to receive rear axle 22 therein. In this embodiment, axle receiving slot 46 is oriented substantially vertically with a slight incline and defines an open end 50 and a closed end 54, wherein open end 50 is disposed below closed end 54. Rearward portion 42 forms a mounting boss 58 with an opening (not shown) dimensioned to receive a mounting bolt 60 therein.

Derailleur 10 is mounted to an extension member 61 having a first end portion 62 and a second end portion 63, wherein first end portion 62 includes a mounting opening 64 dimensioned for receiving mounting bolt 60 therein. Second end portion 63 includes a derailleur attachment structure in the form of a derailleur mounting opening 65 (FIG. 3) dimensioned for receiving a mounting bolt 66 therethrough. Extension member 61 is dimensioned such that, when extension member 61 is attached to frame end 34, derailleur mounting opening 65 is located from approximately 180° to approximately 240° relative to axle receiving opening 46, from approximately 180° to approximately 240° relative to rotational axis X, or, to facilitate measurement independently of axle 22, from approximately 180° to approximately 240° relative to closed end 54 of axle receiving opening 46. Rearward portion 42 extends further downwardly from mounting opening 64 to form a position setting abutment 67 that is used in a known manner to adjust the rotational position of derailleur 10 relative to frame 14.

Figure 4:
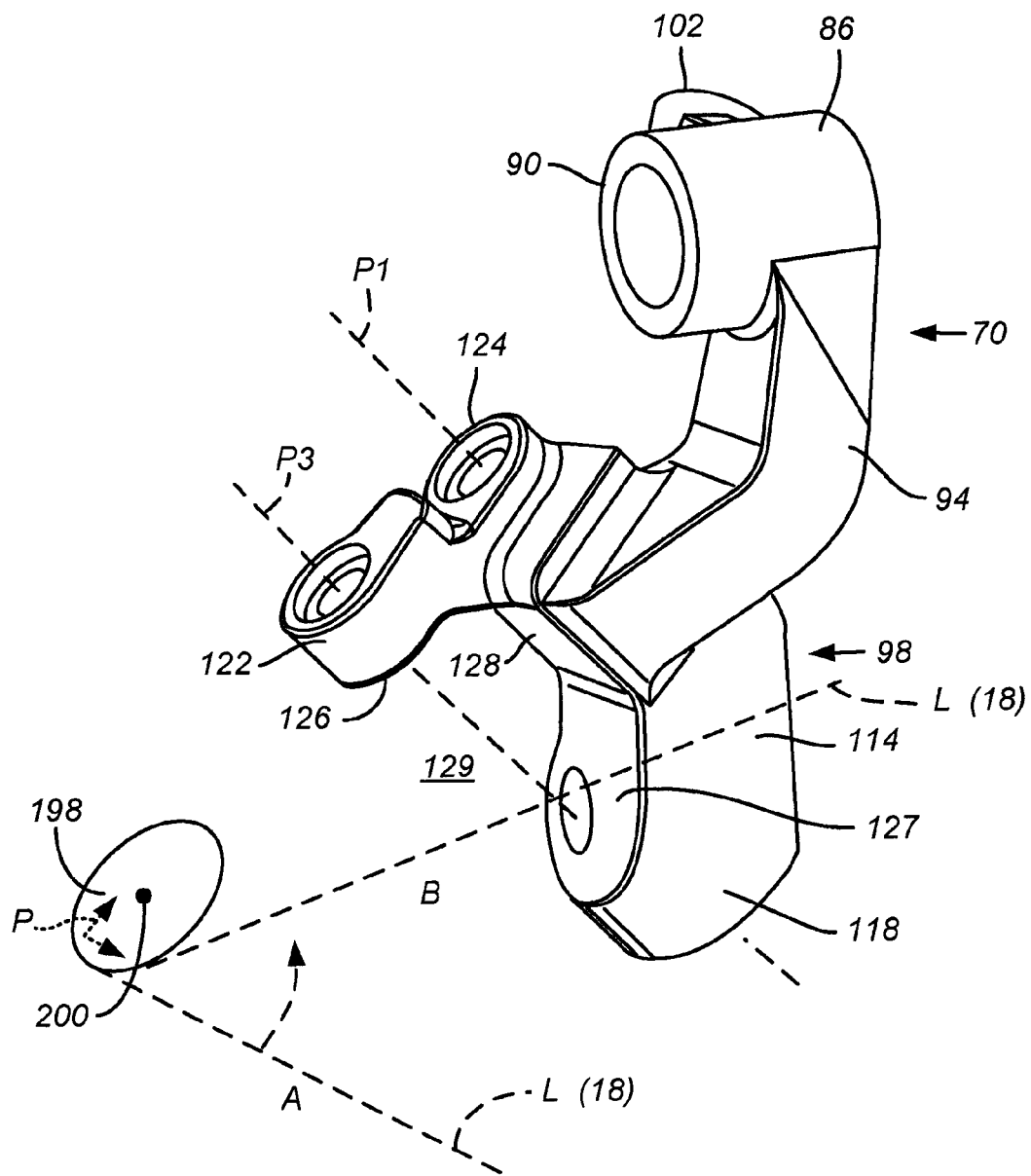
FIG. 4 is an inner rear oblique view of the base member.
Figure 5:
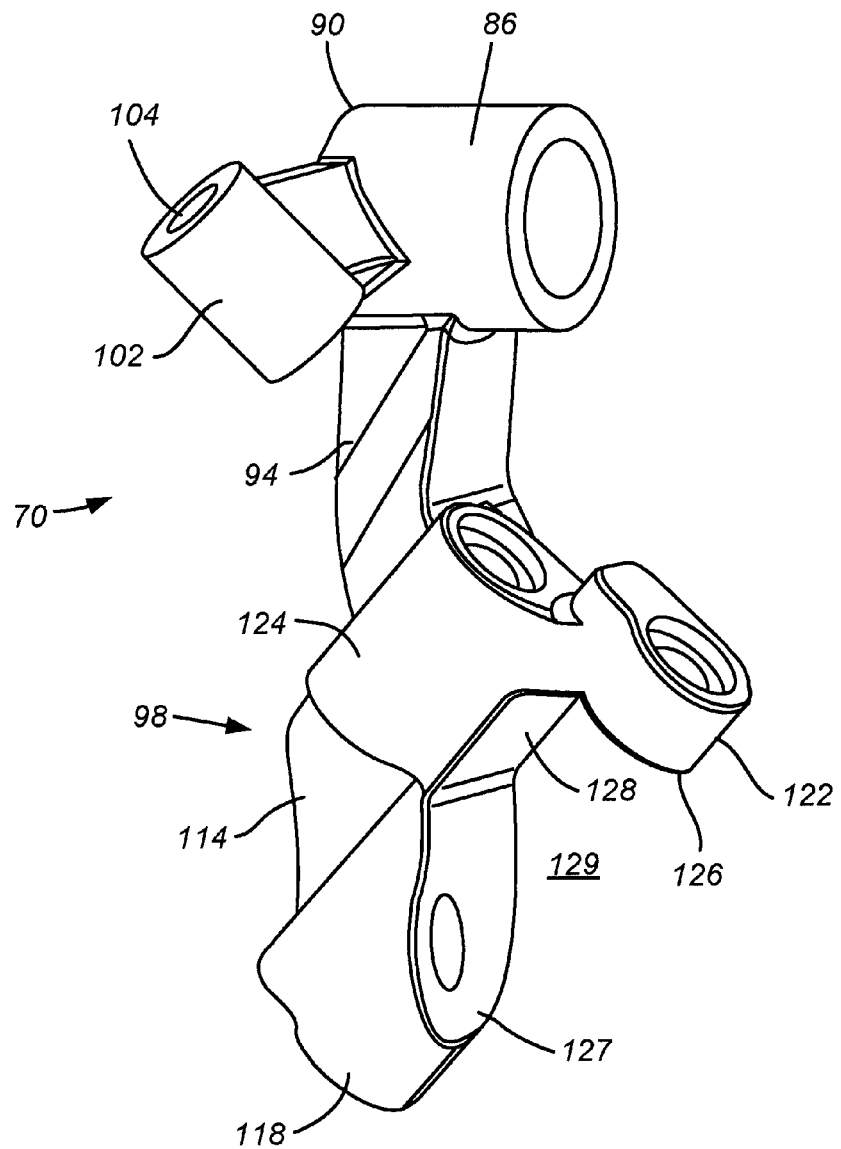
FIG. 5 is an outer rear oblique view of the base member.

Derailleur 10 comprises a base member 70, a movable member 74 that supports a chain guide 78, and a linking mechanism 82 coupled between base member 70 and movable member 74 so that chain guide 78 moves laterally upwardly-outwardly and laterally downwardly-inwardly relative to base member 70. As best seen in FIGS. 4 and 5, base member 70 comprises a cylindrical mounting boss 86 with an annular mounting surface 90 that faces laterally inwardly toward second end portion 63 of extension member 61, a transition portion 94 that extends downwardly from mounting boss 86, and a link coupling portion 98 disposed at a lower end portion of extension portion 94.

An outer casing coupler 102 in the form of a hollow cylinder is disposed at mounting boss 86, wherein outer casing coupler 102 includes an outer casing receiving bore 104 dimensioned to couple to and terminate an outer casing 103 of a Bowden cable in a known manner. Outer casing coupler 102 is positioned to be located rearward from rotational axis X and laterally outwardly from mounting boss 86. If desired, a cable adjusting bolt (not shown), the concept and structure of which are well known, may be mounted in outer casing receiving bore 104 so as to be disposed between outer casing coupler 102 and the outer casing 103 of the Bowden cable.

Link coupling portion 98 includes a support wall 114, a laterally outer link mounting projection 118, a laterally inner link mounting projection 122, and a link mounting boss 124. In this embodiment, a laterally outwardly facing surface 126 of laterally inner link mounting projection 122, a laterally inwardly facing surface 127 of laterally outer link mounting projection 118, and a rearwardly and downwardly facing surface 128 of support wall 114 form a chain receiving space 129 that functions in a manner described below.

As shown in FIG. 1, movable member 74 comprises a main body 130 and a link mounting frame 134. In this embodiment, main body 130 comprises a generally cylindrical member that houses a torsion coil spring (not shown) that biases chain guide 78 in a clockwise direction. Link mounting frame 134 comprises an upper link mounting boss 150 and a lower link mounting boss 154, both of which are formed as one piece with main body 130.

Figure 6:
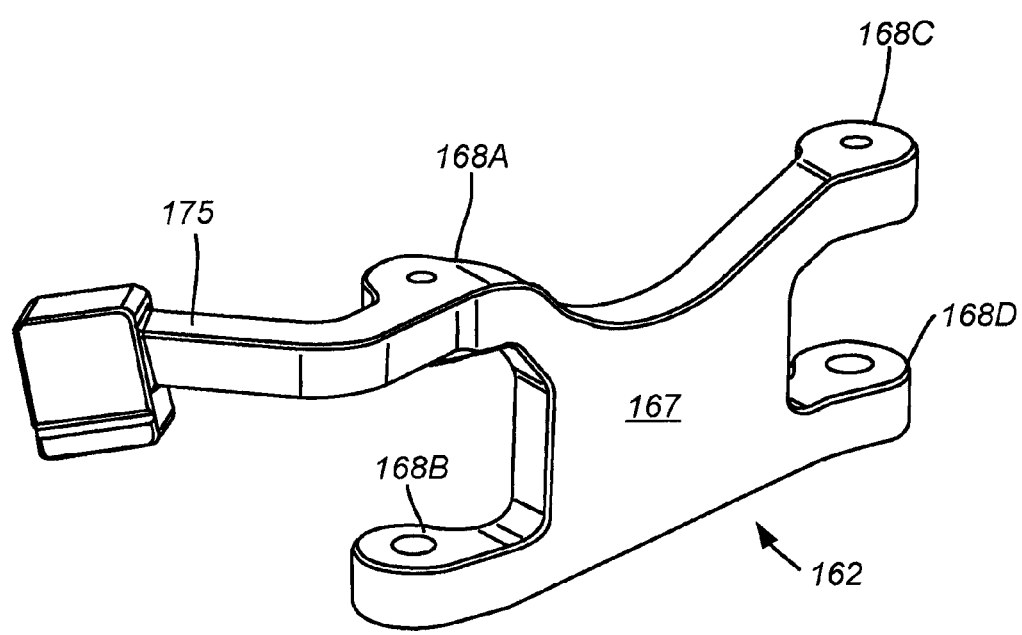
FIG. 6 is a detailed view of an outer linking member.

Linking mechanism 82 comprises linking members in the form of a laterally outer upper link 162 and a laterally inner lower link 166. As shown in FIGS. 1 and 6, upper link 162 comprises a main body 167, four coupling projections 168A-168D, and an actuating arm 175 extending from coupling projection 168A. A conventional cable attachment structure (not shown) in the form of a bolt and a clamping washer is provided at the outer end of actuating arm 175 to attach an inner cable of a Bowden cable. Coupling projection 168A is disposed at the laterally inner side of link mounting boss 124 of base member 70, and coupling projection 168B is disposed at the laterally outer side of link mounting boss 124, wherein coupling projections 168A and 168B are pivotably coupled to link mounting boss 124 by a pivot shaft 170 that is coaxial with a pivot axis P1. In this embodiment, actuating arm 175 is disposed directly above laterally inner link mounting projection 122 of base member 70 so that laterally inner link mounting projection 122 may function as a limit stop for actuating arm 175. Coupling projection 168C is disposed at the laterally inner side of upper link mounting boss 150 of movable member 74, and coupling projection 168D is disposed at the laterally outer side of upper link mounting boss 150, wherein coupling projections 168C and 168D are pivotably coupled to upper link mounting boss 150 through a pivot shaft 174 that is coaxial with a pivot axis P2.

Figure 7:
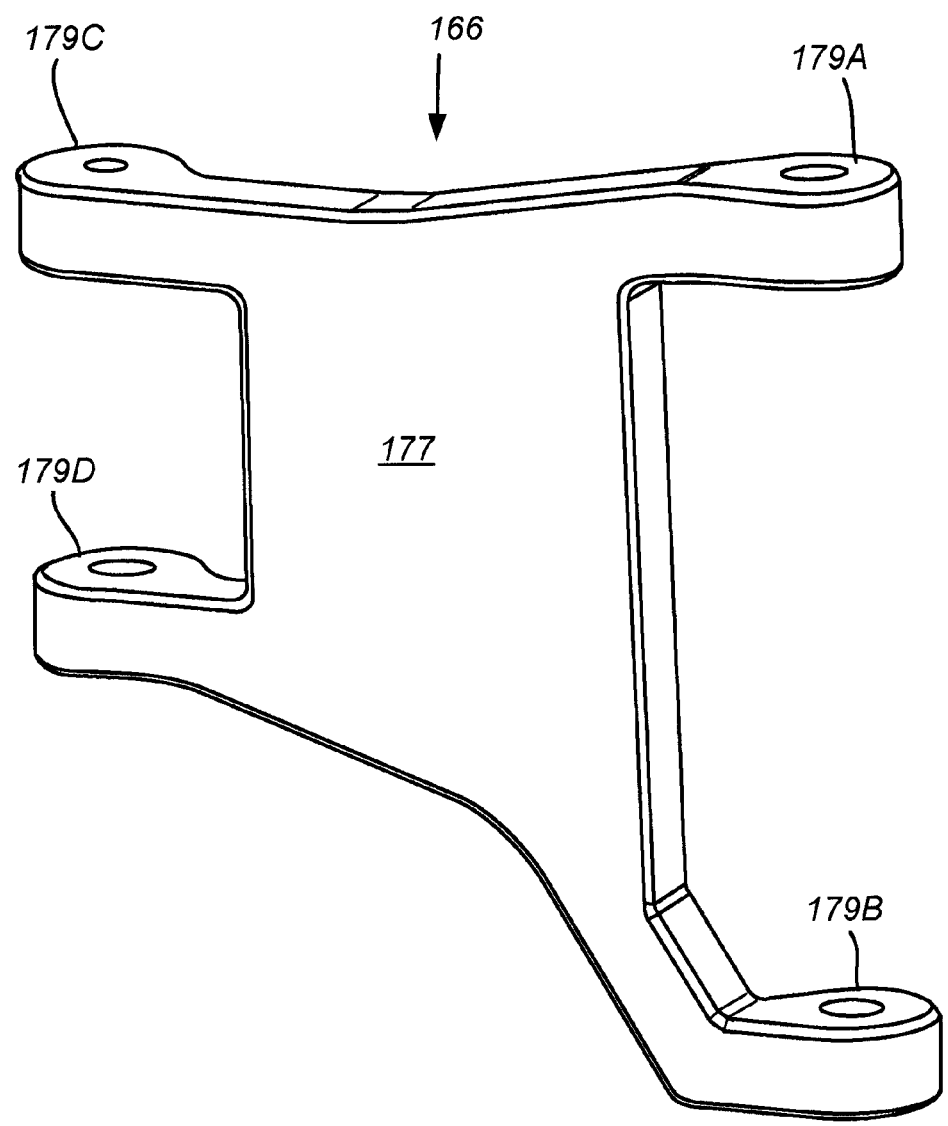
FIG. 7 is a detailed view of an inner linking member.
Figure 8:
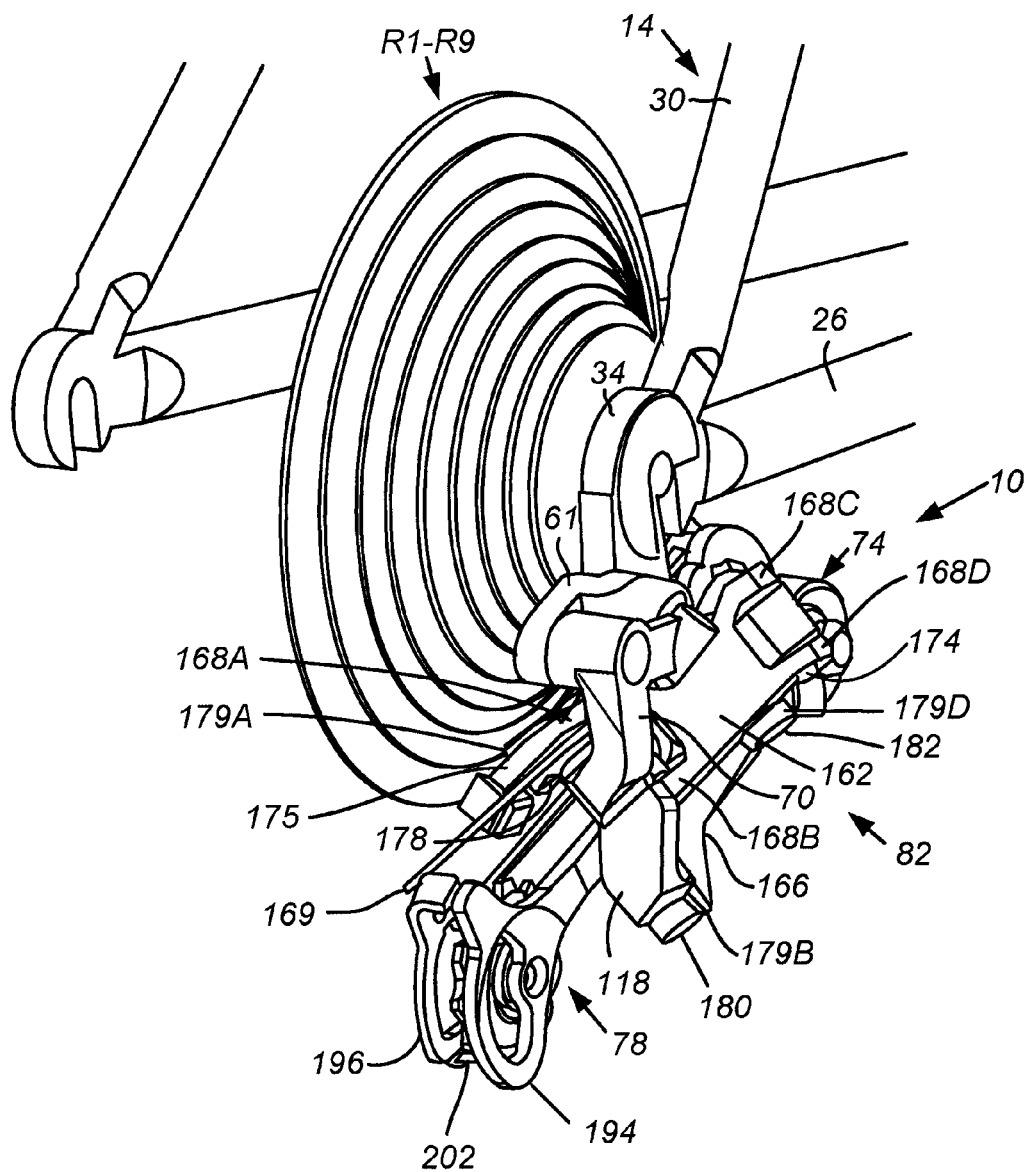
FIG. 8 is a rear oblique view of the derailleur in the high speed position.

As shown in FIGS. 1 and 7, lower link 166 comprises a main body 177 and four coupling projections 179A-179D. Coupling projection 179A is disposed at the laterally inner side of laterally inner link mounting projection 122 of base member 70 and is pivotably coupled thereto by a pivot shaft 178 (FIG. 8) that is coaxial with a pivot axis P3. Coupling projection 179B is disposed at the laterally outer side of laterally outer link mounting projection 118 of base member 70 and is pivotably coupled thereto by a pivot shaft 180 that also is coaxial with pivot axis P3. As shown in FIG. 4, pivot axis P3 intersects chain receiving space 129. Coupling projection 179C is disposed at the laterally inner side of lower link mounting boss 154 of movable member 74, and coupling projection 179D is disposed at the laterally outer side of lower link mounting boss 154, wherein coupling projections 179C and 179D are pivotably coupled to lower link mounting boss 154 through a pivot shaft 182 that is coaxial with a pivot axis P4. A coiled return spring (not shown) is connected between base member 70 and movable member 74 to bias movable member 74 laterally outwardly in a known manner.

In this embodiment, chain guide 78 comprises an outer chain guide frame 194, an inner chain guide frame 196, a first or upper guide pulley 198 (FIG. 3), and a second or lower tension pulley 202. Guide pulley 198, the upper portion of outer chain guide frame 194, and the upper portion of inner chain guide frame 196 are rotatably mounted to main body 130 of movable member 74 through a pivot shaft 200 so as to rotate around a rotational axis Y. Tension pulley 202 is rotatably mounted between outer chain guide frame 194 and inner chain guide frame 196 through a pivot shaft 208. An arcuate chain pushing member 214 is disposed at the upper portion of outer chain guide frame 194 between main body 130 of movable member 74 and guide pulley 198 to push chain 18 when switching chain 18 from a smaller diameter sprocket to a larger diameter sprocket and to prevent chain 18 from derailing from guide pulley 198.

As shown in FIG. 3, guide pulley 198 has a pulley plane P that bisects guide pulley 198. In this embodiment, each tooth on guide pulley 198 is symmetrical and centered on the pulley when viewed perpendicular to pivot shaft 200 so that pulley plane P is located in the center of guide pulley 198, and all of the pulley teeth lie in pulley plane P. In order to provide a decreased laterally outward profile for derailleur 10, the components are structured so that pulley plane P intersects at least one of upper link 162 or lower link 166 when chain guide 78 is disposed in a position somewhere between a laterally outermost rest position and a laterally innermost position (such as the laterally outermost position shown in FIG. 9).

As used throughout herein, the word "intersect" has the ordinary meaning of having one or more points in common. Thus, the term also includes, for example, a tangent relationship. The laterally outermost position may be the laterally outermost position when derailleur 10 is removed from the bicycle. In this case, the laterally outermost position may be determined by the position of chain guide 78 with the derailleur at rest and subjected only to the biasing force of the return spring between base member 70 and movable member 74, and the laterally innermost position is determined by the position of chain guide 78 when chain guide 78 is manually pulled to its laterally innermost position. Alternatively, the laterally outermost position may be determined by the position of chain guide 78 when it is set to be aligned with the smallest diameter rear sprocket R1, and the laterally innermost position may be determined by the position of chain guide 78 when it is set to be aligned with the largest diameter rear sprocket R9. The word "between" is used in an inclusive sense.

Figure 9:
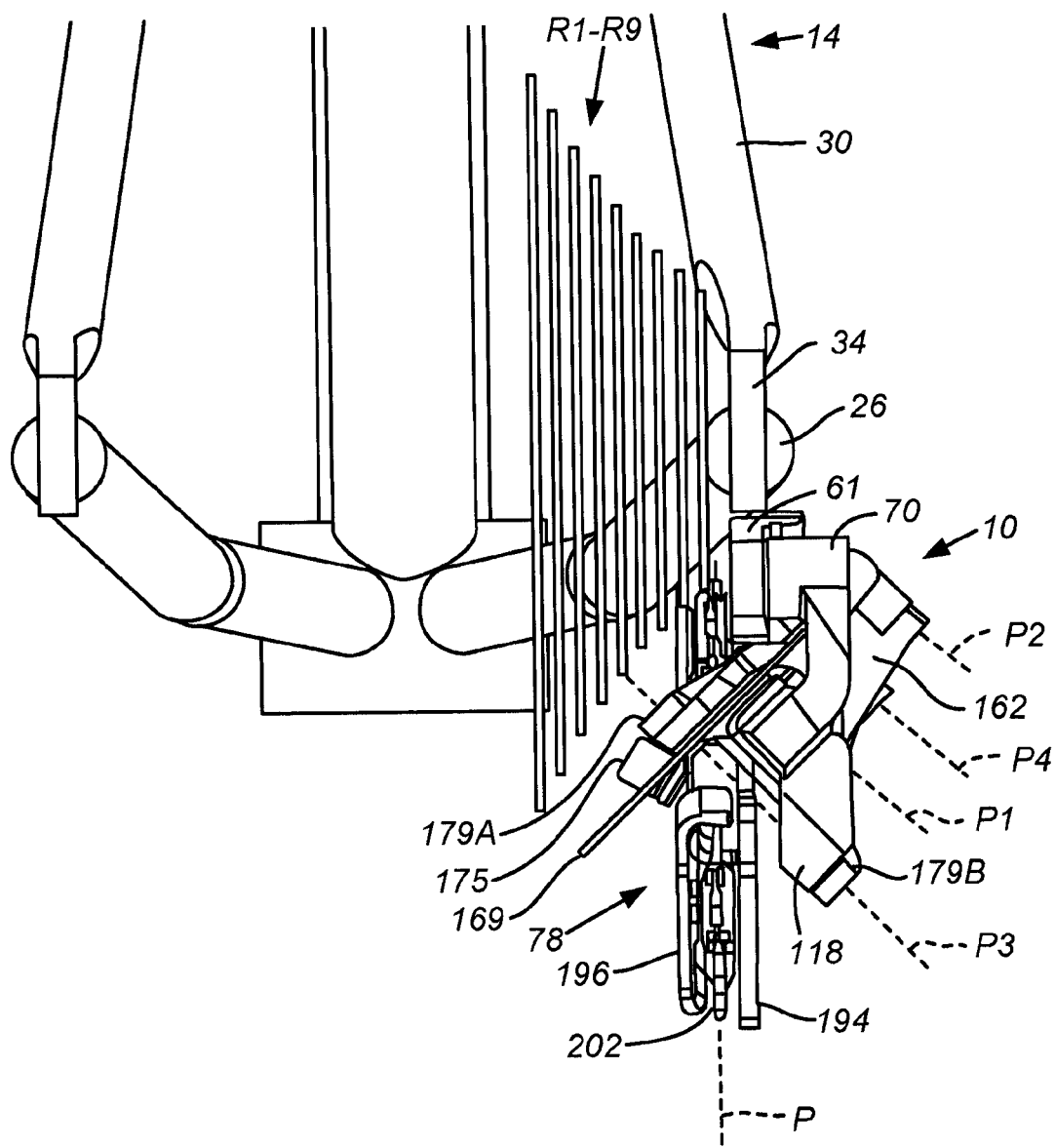
FIG. 9 is a rear view of the derailleur in the high speed position.

Furthermore, in this embodiment, pulley plane P intersects at least one of pivot axis P1 or pivot axis P3 when measured across all components at the coupling when chain guide 78 is disposed in a position somewhere between a laterally outermost rest position and a laterally innermost position (such as the laterally outermost position shown in FIG. 9). For example, pivot shaft 170 defines pivot axis P1 and couples upper link 162 to base member 70. The laterally inner tip of pivot shaft 170 is exposed at the laterally inner side of coupling projection 168A of upper link 162, and the laterally outer tip of pivot shaft 170 exposed at the laterally outer side of coupling projection 168B of upper link 162. The length of pivot axis P1 measured across all components at the coupling therefore extends from the laterally inner tip of pivot shaft 170 at pivot axis P1 to the laterally outer tip of pivot shaft 170. Similarly, pivot shafts 178 and 180 define pivot axis P3 and couple lower link 166 to base member 70. The laterally inner tip of pivot shaft 178 is exposed at the laterally inner side of coupling projection 179A of lower link 166, and the laterally outer tip of pivot shaft 180 is exposed at the laterally outer side of coupling projection 179B of lower link 166. The length of pivot axis P1 measured across all components at the coupling therefore extends from the laterally inner tip of pivot shaft 178 at pivot axis P3 to the laterally outer tip of pivot shaft 180 at pivot axis P3.

In this embodiment, pulley plane P intersects both upper link 162 and lower link 166 as well as pivot axes P1 and P3 when chain guide 78 is disposed in a position somewhere between the laterally outermost position and the laterally innermost position, such as the laterally outermost position shown in FIG. 9. However, it is not necessary to intersect all recited components at all lateral positions of chain guide 78. For example, while at least one of pivot axes P1-P4 is disposed on a laterally inner side of pulley plane P, and at least one of pivot axes P1-P4 is disposed on a laterally outer side of pulley plane P, in this embodiment second pivot axis P2 and fourth pivot axis P4 as measured according to the definition above are disposed entirely on the laterally outer side of pulley plane P in the position shown in FIG. 9. In this embodiment, pulley plane P intersects a space S1 (FIG. 1) between any facing surfaces of upper link 162 and lower link 166. Pulley plane P also intersects base member 70 when chain guide 78 is disposed in a position somewhere between the laterally outermost position and the laterally innermost position, such as the laterally outermost position shown in FIG. 9.

To further facilitate the ability of chain guide 78 to move laterally outwardly-upwardly relative to base member 70 and pivot clockwise relative to movable member 74 while maintaining a low profile, base member 70 is shaped to form chain receiving space 129 as discussed above. As shown schematically in FIG. 4, chain receiving space 129 is dimensioned and positioned such that a straight phantom line L tangent to and extending from guide pulley 198 or tension pulley 202 (e.g., extending rearwardly from a lower portion of guide pulley 198 toward an upper portion of tension pulley 202) and lying within pulley plane P can move from outside chain receiving space 129 (position A) to inside chain receiving space 129 (position B) without intersecting base member 70. Phantom line L typically corresponds to chain 18 as it travels between guide pulley 198 and tension pulley 202. The tangential relation between phantom line L and guide pulley 198 or tension pulley 202 may be determined by common reasoning and may include tangent to a pitch circle of guide pulley 198 or tension pulley 202, tangent to a circle that simply circumferentially intersects the teeth of guide pulley 198 or tension pulley 202, tangent to a circle that intersects the tips of a majority or all of the teeth of guide pulley 198 or tension pulley 202, and so on. As a result, chain receiving space 129 can receive at least a part of chain 18 when chain guide 78 is disposed in a position somewhere between a laterally outermost rest position and a laterally innermost position (such as the laterally outermost position shown in FIG. 9). In other words, chain receiving space 129 is formed for avoiding interference, obstruction, etc. as a result of the proximity of chain 18 to base member 70. Such undesirable effects could include contact between chain 18 and base member 70, contact by base member 70 with mud, vegetation or other undesirable elements carried or drawn by chain 18, and so on, when chain guide 78 is disposed in a position somewhere between a laterally outermost rest position and a laterally innermost position (such as the laterally outermost position shown in FIG. 9).

Figure 10:
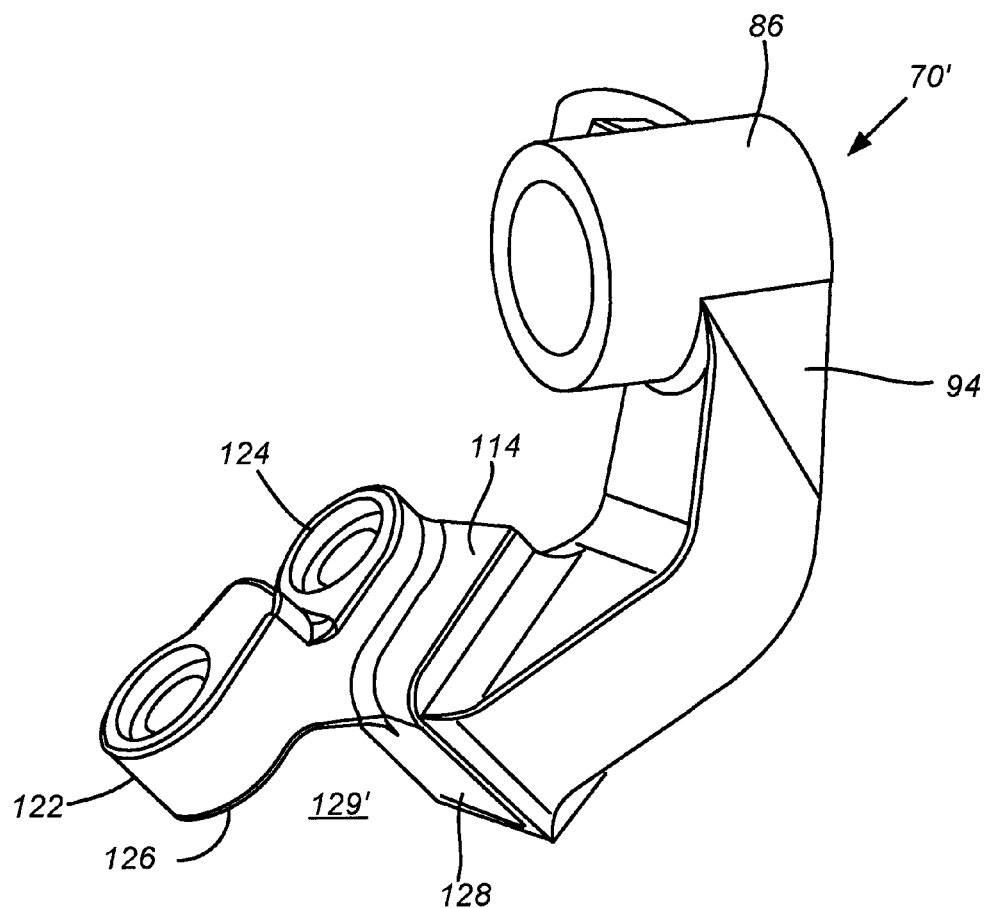
FIG. 10 is an inner rear oblique view of another embodiment of a base member.
Figure 11:
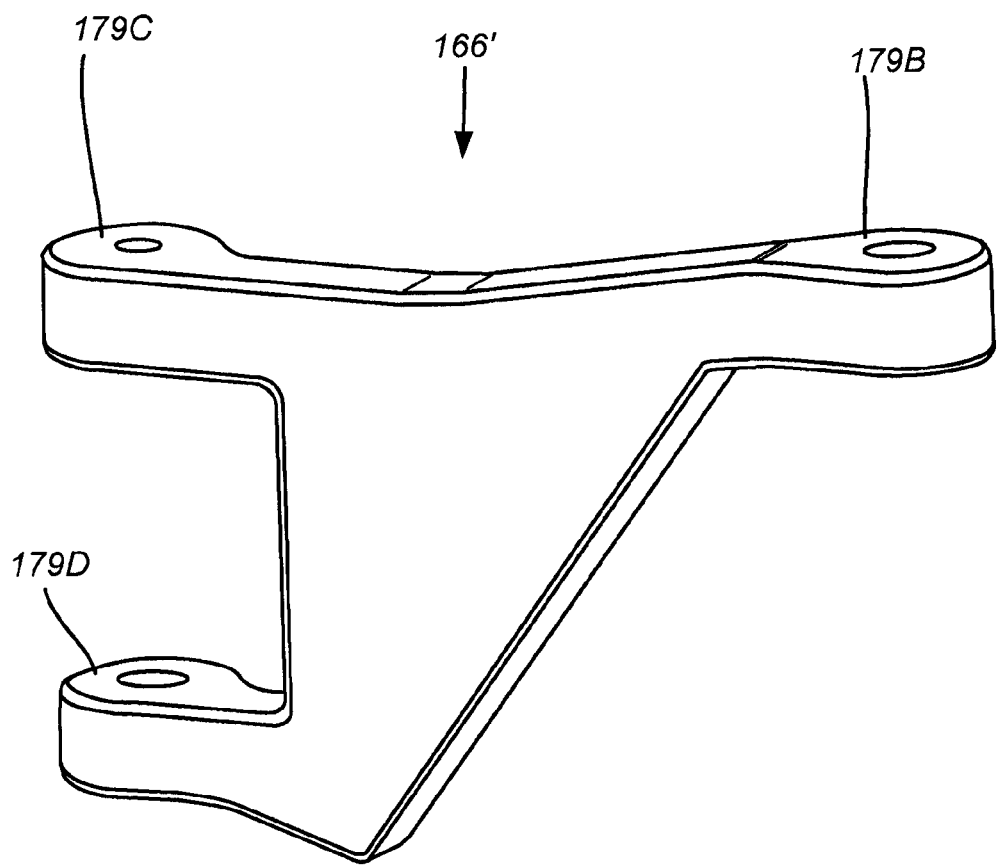
FIG. 11 is a detailed view of an embodiment of an inner linking member used with the base member shown in FIG. 10.

FIG. 10 is an inner rear oblique view of another embodiment of a base member 70', and FIG. 11 is a detailed view of an embodiment of a lower link 166' that may be used with base member 70'. In this embodiment, laterally outer link coupling projection 118 is omitted from base member 70 in the first embodiment, and coupling projection 179B is omitted from lower link 166 in the first embodiment. As a result, lower link 166' is pivotably mounted to base member 70' only by the coupling between coupling projection 179A and laterally inner link coupling projection 122 (through a pivot shaft 178 as in the first embodiment). A chain receiving space 129' that accommodates a phantom line L as described above is formed by the laterally outwardly facing surface 126 of laterally inner link mounting projection 122 and the rearwardly and downwardly facing surface 128 of support wall 114. As a result, chain receiving space 129' can receive at least a part of chain 18 when chain guide 78 is disposed in a position somewhere between a laterally outermost rest position and a laterally innermost position (such as the laterally outermost position shown in FIG. 9).

Figure 12:
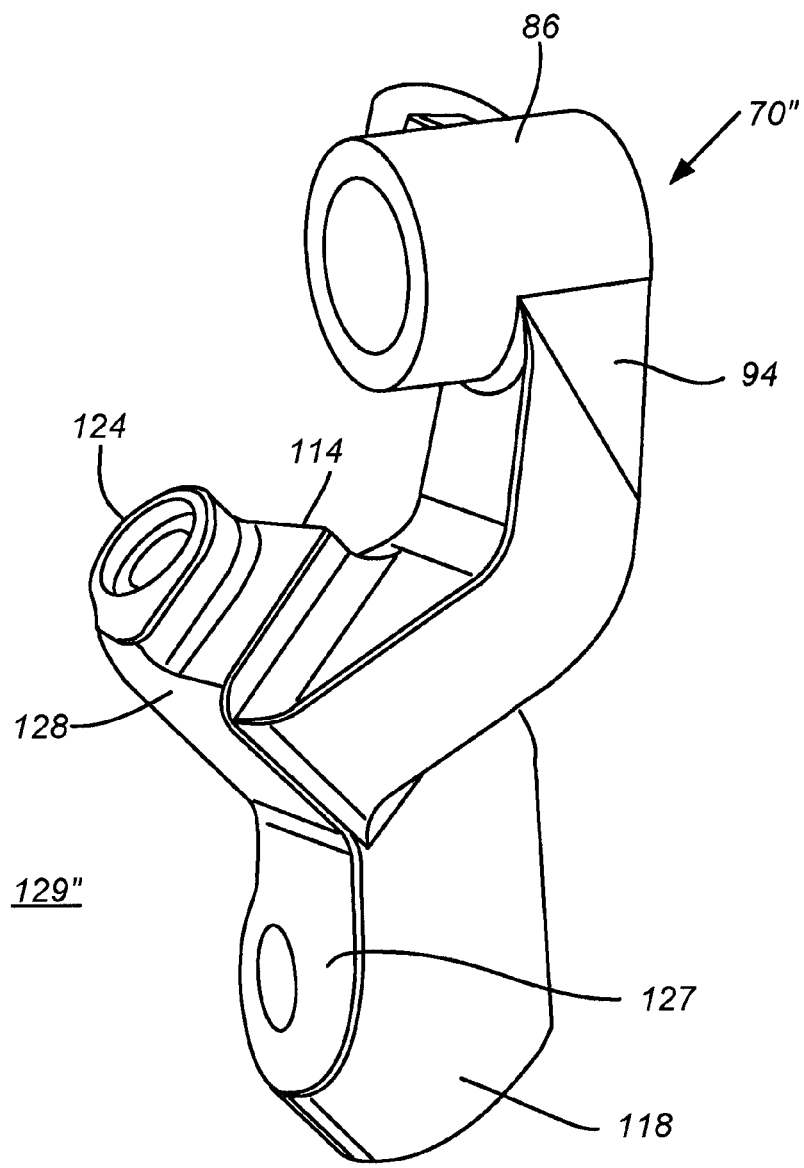
FIG. 12 is an inner rear oblique view of another embodiment of a base member.
Figure 13:
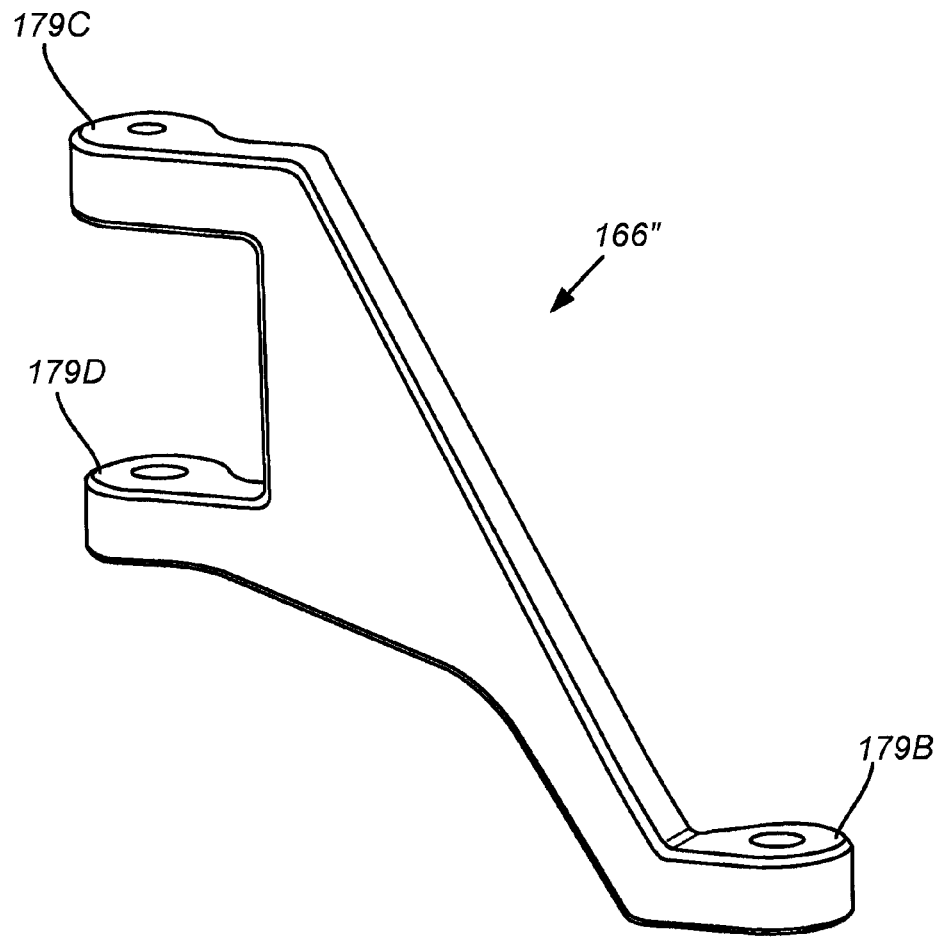
FIG. 13 is a detailed view of an embodiment of an inner linking member used with the base member shown in FIG. 12.

FIG. 12 is an inner rear oblique view of another embodiment of a base member 70", and FIG. 13 is a detailed view of an embodiment of a lower link 166" that may be used with base member 70". In this embodiment, laterally inner link coupling projection 122 is omitted from base member 70 in the first embodiment, and coupling projection 179A is omitted from lower link 166 in the first embodiment. As a result, lower link 166" is pivotably mounted to base member 70" only by the coupling between coupling projection 179B and laterally outer link coupling projection 118 (through a pivot shaft 180 as in the first embodiment). A chain receiving space 129" that accommodates a phantom line L as described above is formed by the laterally inwardly facing surface 127 of laterally outer link mounting projection 118 and the rearwardly and downwardly facing surface 128 of support wall 114. As a result, chain receiving space 129" can receive at least a part of chain 18 when chain guide 78 is disposed in a position somewhere between a laterally outermost rest position and a laterally innermost position (such as the laterally outermost position shown in FIG. 9).

Figure 14:
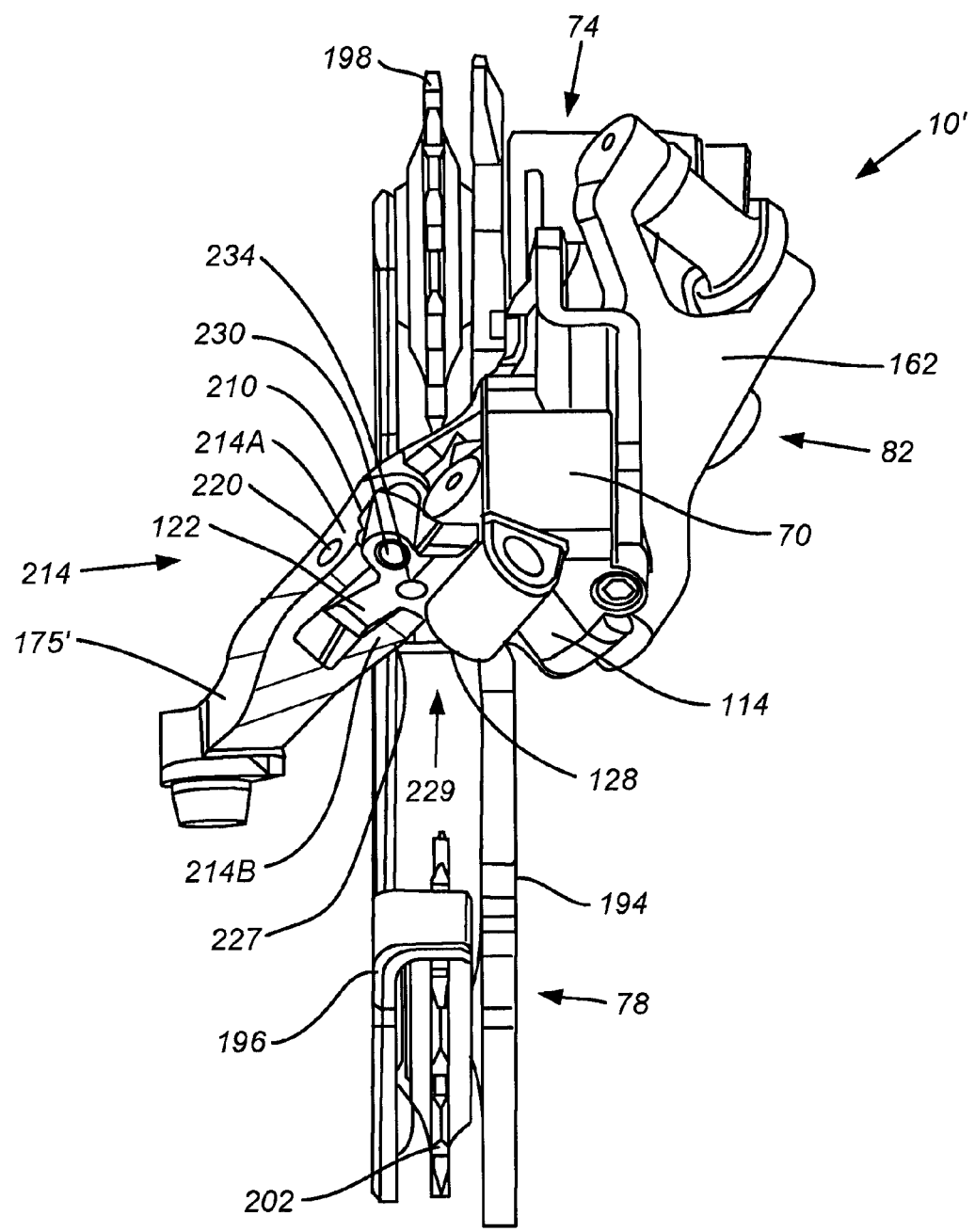
FIG. 14 is a rear view of another embodiment of a derailleur.
Figure 15:
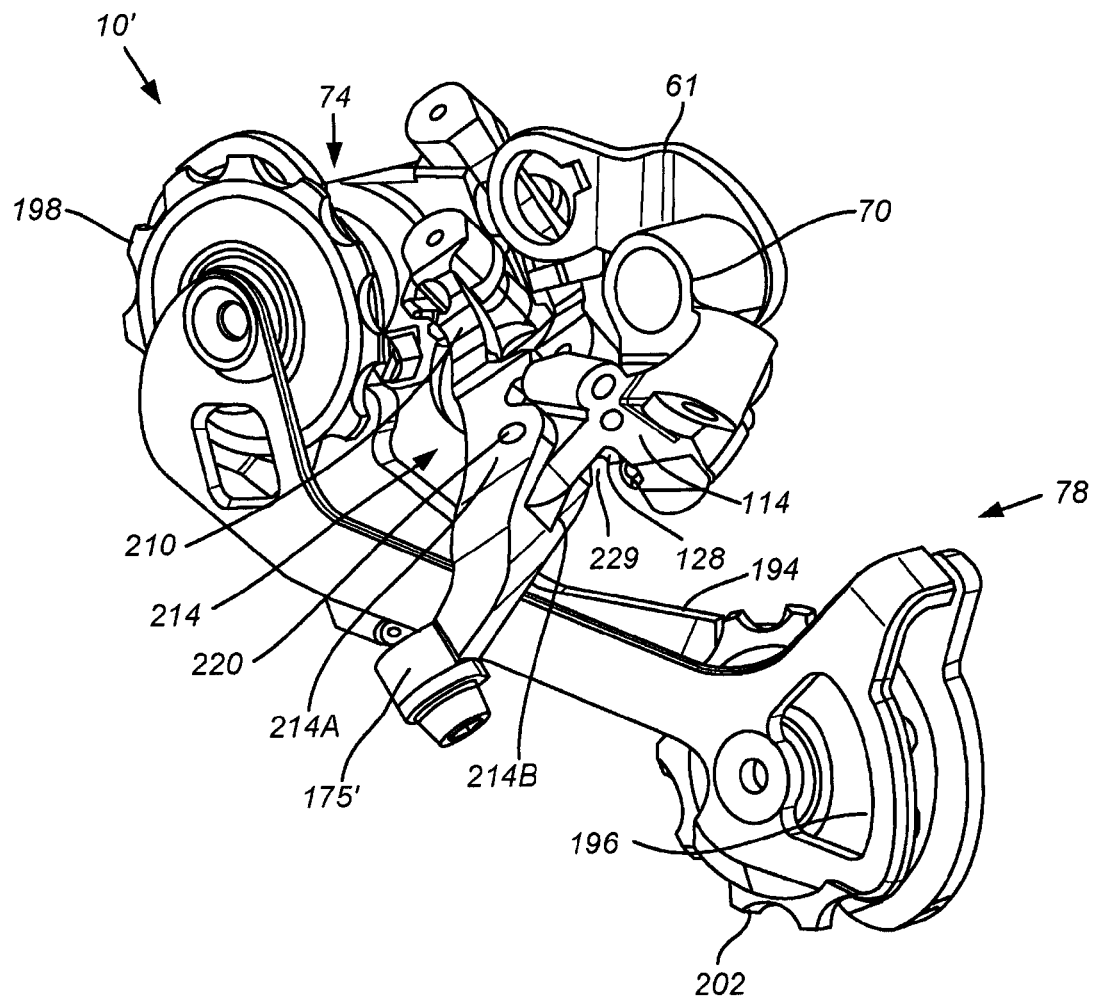
FIG. 15 is a rear oblique view of the derailleur.

FIG. 14 is a rear view of another embodiment of a derailleur 10', and FIG. 15 is an oblique rear view of derailleur 10'. This embodiment uses base member 70' shown in FIG. 10 and a lower link 210 that is a modified version of lower link 166' shown in FIG. 11. More specifically, actuating arm 175 is removed from upper link 162 in the first embodiment, and coupling projection 179A of lower link 166 in the first embodiment is modified to form a coupling projection 214 which, in turn, comprises a pair of spaced apart coupling projections 214A and 214B configured such that laterally inner link coupling projection 122 of base member 70' is sandwiched between coupling projections 214A and 214B. Coupling projections 214A and 214B are pivotably coupled to laterally inner link coupling projection 122 through a pivot shaft 220. An actuating arm 175' extends rearwardly from coupling projection 214. A chain receiving space 229 that accommodates a phantom line L as described above is formed by a laterally outwardly facing surface 227 of coupling projection 214B and the rearwardly and downwardly facing surface 128 of support wall 114. As a result, chain receiving space 229 can receive at least a part of chain 18 when chain guide 78 is disposed in a position somewhere between a laterally outermost rest position and a laterally innermost position (such as the laterally outermost position shown in FIG. 9). A high position adjusting bolt 230 and a low position adjusting bolt 234 may be mounted to coupling projection 214 to perform well known lateral range adjustments for chain guide 78.

While the above is a description of various embodiments of inventive features, further modifications may be employed without departing from the spirit and scope of the present invention. For example, while the various chain receiving spaces accommodated the chain as it extended between the guide pulley and the tension pulley, chain receiving spaces may be formed in the base member to accommodate any operative relation between the base member and the chain when the chain is positioned for normal operation of the bicycle. The size, shape, location or orientation of the various components may be changed as desired. Components that are shown directly connected or contacting each other may have intermediate structures disposed between them. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle rear derailleur comprising:
   a base member;
   a movable member that supports a chain guide including a pulley that rotates around a pulley axis, wherein the pulley has a pulley plane that bisects the pulley and is substantially perpendicular to the pulley axis;
   a first linking member coupled between the base member and the movable member so that the chain guide moves laterally relative to the base member between a first lateral position and a second lateral position;
   a first pivot shaft disposed at the first linking member to couple the first linking member to the base member; and
   a separate second pivot shaft disposed at the first linking member to couple the first linking member to the base member;
   wherein the first linking member pivots relative to the base member around a first pivot axis;
   wherein the pulley plane is disposed between the first pivot shaft and the second pivot shaft and is non-parallel to the first pivot axis;
   wherein the first pivot shaft and the second pivot shaft have respective first and second surfaces that face in directions towards each other, wherein the first and second surfaces do not contact each other when the first linking member is coupled to the base member.

2. The derailleur according to claim 1 wherein the base member comprises:
   a mounting portion for mounting the base member to a bicycle frame; and
   a link coupling portion for coupling the first linking member to the mounting portion;
   wherein the first pivot shaft is attached to the link coupling portion; and
   wherein the second pivot shaft is attached to the link coupling portion.

3. The derailleur according to claim 2 wherein the link coupling portion comprises:
   a laterally inner link mounting projection; and
   a laterally outer link mounting projection;
   wherein the first pivot shaft is attached to the laterally inner link mounting projection; and
   wherein the second pivot shaft is attached to the laterally outer link mounting projection.

4. The derailleur according to claim 3 wherein the laterally inner link mounting projection includes a laterally outwardly facing surface, and wherein the laterally outer link mounting projection includes a laterally inwardly facing surface.

5. The derailleur according to claim 4 wherein at least one of the laterally inwardly facing surface or the laterally outwardly facing surface faces the other laterally inwardly facing surface or laterally outwardly facing surface.

6. The derailleur according to claim 4 wherein the first pivot shaft and the second pivot shaft are coaxial with a common pivot axis.

7. The derailleur according to claim 6 wherein at least one of the laterally inwardly facing surface or the laterally outwardly facing surface is substantially perpendicular to the common axis.

8. The derailleur according to claim 6 wherein at least one of the laterally inwardly facing surface or the laterally outwardly facing surface is inclined relative to the common axis.

9. The derailleur according to claim 6 wherein one of the laterally inwardly facing surface or the laterally outwardly facing surface is substantially perpendicular to the common axis, and wherein the other one of the laterally inwardly facing surface or the laterally outwardly facing surface is inclined relative to the common axis.

10. The derailleur according to claim 6 wherein the base member further comprises a transition portion extending from the mounting portion and connecting the link coupling portion to the mounting portion.

11. The derailleur according to claim 2 further comprising an extension member structured to be mounted to a rear frame end of the bicycle frame, wherein the mounting portion is mounted to the extension member.

12. The derailleur according to claim 2 further comprising an extension member having a first portion and a second portion, wherein the first portion is structured for attachment to a bicycle frame member having an axle receiving opening, wherein the second portion includes a derailleur attachment structure for mounting the mounting portion, and wherein the extension member is dimensioned so that, when the extension member is attached to the bicycle frame, the mounting portion is located from approximately 180° to approximately 240° relative to the axle receiving opening.

13. The derailleur according to claim 1 wherein the pulley plane intersects the first linking member when the chain guide is located at a first position between the first lateral position and the second lateral position.

14. The derailleur according to claim 13 further comprising a biasing member that biases the movable member so that the chain guide is set at the first lateral position, wherein the pulley plane intersects the first linking member when the chain guide is located at the first lateral position.

15. The derailleur according to claim 14 wherein the first lateral position is a laterally outermost position of the chain guide.

16. The derailleur according to claim 13 further comprising a second linking member coupled between the base member and the movable member so that the chain guide moves laterally relative to the base member between the first lateral position and the second lateral position, wherein the second linking member is disposed laterally outward from the first linking member.

17. The derailleur according to claim 16 wherein the pulley plane intersects the second linking member when the chain guide is located at a second position between the first lateral position and the second lateral position.

18. The derailleur according to claim 17 wherein the pulley plane intersects the second linking member when the chain guide is located at the first position.

19. The derailleur according to claim 17 further comprising a biasing member that biases the movable member so that the chain guide is set at the first lateral position, wherein the pulley plane intersects the first linking member when the chain guide is located at the first lateral position.

20. The derailleur according to claim 19 wherein the pulley plane intersects the second linking member when the chain guide is located at the first lateral position.

21. The derailleur according to claim 20 wherein the first lateral position is a laterally outermost position of the chain guide.

22. The derailleur according to claim 16 wherein the pulley plane intersects a space between the first linking member and the second linking member when the chain guide is located at the first position.

23. The derailleur according to claim 22 wherein a movable member plane intersects an innermost surface of the movable member and is oriented substantially parallel to the pulley plane, and wherein at least a portion of a space between the pulley plane and the movable member plane intersects the space between the first linking member and the second linking member.

24. The derailleur according to claim 23 wherein the movable member plane intersects at least one of the first linking member or the second linking member when the chain guide is located at the first position.

25. The derailleur according to claim 24 further comprising a biasing member that biases the chain guide so that the chain guide is set at the first lateral position, wherein the movable member plane intersects the first linking member when the chain guide is located at the first lateral position.

26. The derailleur according to claim 25 wherein the first lateral position is a laterally outermost position of the chain guide.

27. The derailleur according to claim 26 wherein the movable member plane intersects the second linking member when the chain guide is located at the first lateral position.

28. The derailleur according to claim 23 wherein the movable member plane intersects the space between the first linking member and the second linking member when the chain guide is located at the first position.

29. The derailleur according to claim 28 further comprising a biasing member that biases the chain guide so that the chain guide is set at the first lateral position, wherein the movable member plane intersects the first linking member when the chain guide is located at the first lateral position.

30. The derailleur according to claim 29 wherein the first lateral position is a laterally outermost position of the chain guide.

31. The derailleur according to claim 13 wherein the pulley plane intersects the base member when the chain guide is located at the first position.

32. The derailleur according to claim 31 wherein the first position is a laterally outermost position.

33. The derailleur according to claim 13 wherein the first pivot axis extends across all components at the coupling of the first linking member and the base member, wherein the first linking member is coupled to the movable member for pivoting around a second pivot axis that extends across all components at the coupling of the first linking member and the movable member, and wherein the pulley plane intersects at least one of the first pivot axis or the second pivot axis when the chain guide is located at a first position between the first lateral position and the second lateral position.

34. The derailleur according to claim 33 further comprising a biasing member that biases the chain guide so that the chain guide is set at the first lateral position, wherein the pulley plane intersects the at least one of the first pivot axis or the second pivot axis when the chain guide is located at the first lateral position.

35. The derailleur according to claim 34 wherein the first lateral position is a laterally outermost position of the chain guide.

36. The derailleur according to claim 35 wherein the pulley plane intersects the first pivot axis when the chain guide is located at the first lateral position.

37. The derailleur according to claim 33 wherein a movable member plane intersects an innermost surface of the movable member and is oriented substantially parallel to the pulley plane, and wherein the movable member plane intersects at least one of the first pivot axis or the second pivot axis when the chain guide is located at the first lateral position.

38. The derailleur according to claim 37 further comprising a biasing member that biases the movable member so that the chain guide is set at the first lateral position, wherein the movable member plane intersects the at least one of the first pivot axis or the second pivot axis when the chain guide is located at the first lateral position.

39. The derailleur according to claim 38 wherein the first lateral position is a laterally outermost position of the chain guide.

40. The derailleur according to claim 39 wherein the movable member plane intersects the second pivot axis when the chain guide is located at the first lateral position.

41. The derailleur according to claim 37 wherein the movable member plane intersects the first pivot axis when the chain guide is located at the first lateral position.

42. The derailleur according to claim 33 wherein at least a portion of the first pivot axis is disposed on a laterally inner side of the pulley plane, and wherein at least a portion of the second pivot axis is disposed on a laterally outer side of the pulley plane.

43. The derailleur according to claim 42 wherein the second pivot axis is disposed entirely on the laterally outer side of the pulley plane.

44. A bicycle rear derailleur comprising:
a base member;
an extension member structured to be mounted to a rear frame end of a bicycle frame, wherein the extension member is a separate member from the bicycle frame;
wherein the extension member has a first end for coupling to the bicycle frame and a second end for coupling to the base member;
a movable member that supports a chain guide including a pulley that rotates around a pulley axis, wherein the pulley has a pulley plane that bisects the pulley and is substantially perpendicular to the pulley axis;
a first linking member coupled between the base member and the movable member so that the chain guide moves laterally relative to the base member between a first lateral position and a second lateral position;
wherein the base member comprises:
a mounting portion mounted to the second end of the extension member for mounting the base member to a bicycle frame so that the second end of the extension member and the mounting portion are disposed behind the first end of the extension member; and
a link coupling portion for coupling the first linking member to the mounting portion;
wherein the link coupling portion comprises:
a laterally inner link mounting projection that includes a laterally inwardly facing surface and a laterally outwardly facing surface; and
a laterally outer link mounting projection that includes a laterally inwardly facing surface and a laterally outwardly facing surface; and
wherein the first linking member comprises:
a first coupling projection disposed at the laterally inwardly facing surface of the laterally inner link mounting projection, and
a second coupling projection disposed at the laterally outwardly facing surface of the laterally outer link mounting projection;
a first pivot shaft disposed at the first coupling projection and at the laterally inner link mounting projection to couple the first linking member to the base member; and
a separate second pivot shaft disposed at the second coupling projection and at the laterally outer link mounting projection to couple the first linking member to the base member;
wherein the first linking member pivots relative to the base member around a first pivot axis;
wherein the pulley plane is disposed between the first pivot shaft and the second pivot shaft and is non-parallel to the first pivot axis;
wherein the first pivot shaft and the second pivot shaft have respective first and second surfaces that face in directions towards each other, wherein the first and second surfaces do not contact each other when the first linking member is coupled to the base member.

45. The derailleur according to claim 44 wherein the first linking member is asymmetrical when bisected along the longer dimension of the first linking member.

46. The derailleur according to claim 44 wherein the first coupling projection and the second coupling projection both pivot relative to the base member around a common axis that extends through the laterally inner link mounting projection and through the laterally outer link mounting projection.

47. The derailleur according to claim 46 wherein a thickness between the laterally inwardly facing surface and the laterally outwardly facing surface of one of the laterally inner link mounting projection or the laterally outer link mounting projection at the common axis is greater than a thickness between the laterally inwardly facing surface and the laterally outwardly facing surface of the other one of the laterally inner link mounting projection or the laterally outer link mounting projection at the common axis.

48. The derailleur according to claim 47 wherein at least one of the laterally inwardly facing surface of the laterally outer link mounting projection or the laterally outwardly facing surface of the laterally inner link mounting projection is substantially perpendicular to the common axis.

49. The derailleur according to claim 47 wherein at least one of the laterally inwardly facing surface of the laterally outer link mounting projection or the laterally outwardly facing surface of the laterally inner link mounting projection is inclined relative to the common axis.

50. The derailleur according to claim 47 wherein one of the laterally inwardly facing surface of the laterally outer link mounting projection or the laterally outwardly facing surface of the laterally inner link mounting projection is substantially perpendicular to the common axis, and wherein the other one of the laterally inwardly facing surface of the laterally outer link mounting projection or the laterally outwardly facing surface of the laterally inner link mounting projection is inclined relative to the common axis.

51. The derailleur according to claim 44 wherein the pulley plane intersects the first linking member when the chain guide is located at a first position between the first lateral position and the second lateral position.

52. The derailleur according to claim 51 further comprising a biasing member that biases the movable member so that the chain guide is set at the first lateral position, wherein the pulley plane intersects the first linking member when the chain guide is located at the first lateral position.

53. The derailleur according to claim 52 wherein the first lateral position is a laterally outermost position of the chain guide.

54. The derailleur according to claim 51 further comprising a second linking member coupled between the base member and the movable member so that the chain guide moves laterally relative to the base member between the first lateral position and the second lateral position, wherein the second linking member is disposed laterally outward from the first linking member.

55. The derailleur according to claim 54 wherein the pulley plane intersects the second linking member when the chain guide is located at a second position between the first lateral position and the second lateral position.

56. The derailleur according to claim 55 wherein the pulley plane intersects the second linking member when the chain guide is located at the first position.

57. The derailleur according to claim 55 further comprising a biasing member that biases the movable member so that the chain guide is set at the first lateral position, wherein the pulley plane intersects the first linking member when the chain guide is located at the first lateral position.

58. The derailleur according to claim 57 wherein the pulley plane intersects the second linking member when the chain guide is located at the first lateral position.

59. The derailleur according to claim 58 wherein the first lateral position is a laterally outermost position of the chain guide.

60. The derailleur according to claim 54 wherein the pulley plane intersects a space between the first linking member and the second linking member when the chain guide is located at the first position.

61. The derailleur according to claim 60 wherein a movable member plane intersects an innermost surface of the movable member and is oriented substantially parallel to the pulley plane, and wherein at least a portion of a space between the pulley plane and the movable member plane intersects the space between the first linking member and the second linking member.

62. The derailleur according to claim 61 wherein the movable member plane intersects at least one of the first linking member or the second linking member when the chain guide is located at the first position.

63. The derailleur according to claim 62 further comprising a biasing member that biases the chain guide so that the chain guide is set at the first lateral position, wherein the movable member plane intersects the first linking member when the chain guide is located at the first lateral position.

64. The derailleur according to claim 63 wherein the first lateral position is a laterally outermost position of the chain guide.

65. The derailleur according to claim 64 wherein the movable member plane intersects the second linking member when the chain guide is located at the first lateral position.

66. The derailleur according to claim 61 wherein the movable member plane intersects the space between the first linking member and the second linking member when the chain guide is located at the first position.

67. The derailleur according to claim 66 further comprising a biasing member that biases the chain guide so that the chain guide is set at the first lateral position, wherein the movable member plane intersects the first linking member when the chain guide is located at the first lateral position.

68. The derailleur according to claim 67 wherein the first lateral position is a laterally outermost position of the chain guide.

69. The derailleur according to claim 51 wherein the pulley plane intersects the base member when the chain guide is located at the first position.

70. The derailleur according to claim 69 wherein the first position is a laterally outermost position.

71. The derailleur according to claim 51 wherein the first pivot axis extends across all components at the coupling of the first linking member and the base member, wherein the first linking member is coupled to the movable member for pivoting around a second pivot axis that extends across all components at the coupling of the first linking member and the movable member, and wherein the pulley plane intersects at least one of the first pivot axis or the second pivot axis when the chain guide is located at a first position between the first lateral position and the second lateral position.

72. The derailleur according to claim 71 further comprising a biasing member that biases the chain guide so that the chain guide is set at the first lateral position, wherein the pulley plane intersects the at least one of the first pivot axis or the second pivot axis when the chain guide is located at the first lateral position.

73. The derailleur according to claim 72 wherein the first lateral position is a laterally outermost position of the chain guide.

74. The derailleur according to claim 73 wherein the pulley plane intersects the first pivot axis when the chain guide is located at the first lateral position.

75. The derailleur according to claim 71 wherein a movable member plane intersects an innermost surface of the movable member and is oriented substantially parallel to the pulley plane, and wherein the movable member plane intersects at least one of the first pivot axis or the second pivot axis when the chain guide is located at the first lateral position.

76. The derailleur according to claim 75 further comprising a biasing member that biases the movable member so that the chain guide is set at the first lateral position, wherein the movable member plane intersects the at least one of the first pivot axis or the second pivot axis when the chain guide is located at the first lateral position.

77. The derailleur according to claim 76 wherein the first lateral position is a laterally outermost position of the chain guide.

78. The derailleur according to claim 77 wherein the movable member plane intersects the second pivot axis when the chain guide is located at the first lateral position.

79. The derailleur according to claim 75 wherein the movable member plane intersects the first pivot axis when the chain guide is located at the first lateral position.

80. The derailleur according to claim 71 wherein at least a portion of the first pivot axis is disposed on a laterally inner side of the pulley plane, and wherein at least a portion of the second pivot axis is disposed on a laterally outer side of the pulley plane.

81. The derailleur according to claim 80 wherein the second pivot axis is disposed entirely on the laterally outer side of the pulley plane.

82. The derailleur according to claim 44 wherein the extension member is dimensioned so that, when the extension member is attached to the bicycle frame, the mounting portion of the base member is located from substantially 180° to substantially 240° relative to the axle receiving opening.

83. A bicycle rear derailleur comprising:
a base member;
a movable member that supports a chain guide including a pulley that rotates around a pulley axis, wherein the pulley has a pulley plane that bisects the pulley and is substantially perpendicular to the pulley axis;
a first linking member coupled between the base member and the movable member so that the chain guide moves laterally relative to the base member between a first lateral position and a second lateral position;
wherein the base member comprises:
   a mounting portion for mounting the base member to a bicycle frame; and
   a link coupling portion for coupling the first linking member to the mounting portion;
wherein the link coupling portion comprises:
   a laterally inner link mounting projection that includes a laterally inwardly facing surface and a laterally outwardly facing surface; and
   a laterally outer link mounting projection that includes a laterally inwardly facing surface and a laterally outwardly facing surface;
a first pivot shaft disposed at the laterally inner link mounting projection to couple the first linking member to the base member; and
a separate second pivot shaft disposed at the laterally outer link mounting projection to couple the first linking member to the base member;
wherein the first pivot shaft and the second pivot shaft have respective first and second surfaces that face in directions towards each other, wherein the first and second surfaces do not contact each other when the first linking member is coupled to the base member;
wherein the first linking member pivots relative to the base member around a common axis that extends through the laterally inner link mounting projection and through the laterally outer link mounting projection;
wherein the pulley plane is disposed between the first pivot shaft and the second pivot shaft and is non-parallel to the common axis; and
wherein a thickness between the laterally inwardly facing surface and the laterally outwardly facing surface of one of the inner link mounting projection or the laterally outer link mounting projection at the common axis is greater than a thickness between the laterally inwardly facing surface and the laterally outwardly facing surface of the other one of the inner link mounting projection or the laterally outer link mounting projection at the common axis.

84. The derailleur according to claim 83 wherein at least one of the laterally inwardly facing surface of the laterally outer link mounting projection or the laterally outwardly facing surface of the laterally inner link mounting projection is substantially perpendicular to the common axis.

85. The derailleur according to claim 83 wherein at least one of the laterally inwardly facing surface of the laterally outer link mounting projection or the laterally outwardly facing surface of the laterally inner link mounting projection is inclined relative to the common axis.

86. The derailleur according to claim 83 wherein one of the laterally inwardly facing surface of the laterally outer link mounting projection or the laterally outwardly facing surface of the laterally inner link mounting projection is substantially perpendicular to the common axis, and wherein the other one of the laterally inwardly facing surface of the laterally outer link mounting projection or the laterally outwardly facing surface of the laterally inner link mounting projection is inclined relative to the common axis.

87. The derailleur according to claim 83 further comprising an extension member structured to be mounted to a rear frame end of the bicycle frame, wherein the mounting portion is mounted to the extension member.

88. The derailleur according to claim 83 further comprising an extension member having a first portion and a second portion, wherein the first portion is structured for attachment to a bicycle frame member having an axle receiving opening, wherein the second portion includes a derailleur attachment structure for mounting the mounting portion, and wherein the extension member is dimensioned so that, when the extension member is attached to the bicycle frame, the base member is located from approximately 180° to approximately 240° relative to the axle receiving opening.

89. The derailleur according to claim 83 wherein the pulley plane intersects the first linking member when the chain guide is located at a first position between the first lateral position and the second lateral position.

90. The derailleur according to claim 89 further comprising a biasing member that biases the movable member so that the chain guide is set at the first lateral position, wherein the pulley plane intersects the first linking member when the chain guide is located at the first lateral position.

91. The derailleur according to claim 90 wherein the first lateral position is a laterally outermost position of the chain guide.

92. The derailleur according to claim 89 further comprising a second linking member coupled between the base member and the movable member so that the chain guide moves laterally relative to the base member between the first lateral position and the second lateral position, wherein the second linking member is disposed laterally outward from the first linking member.

93. The derailleur according to claim 92 wherein the pulley plane intersects the second linking member when the chain guide is located at a second position between the first lateral position and the second lateral position.

94. The derailleur according to claim 93 wherein the first position is the same as the second position.

95. The derailleur according to claim 93 further comprising a biasing member that biases the movable member so that the chain guide is set at the first lateral position, wherein the pulley plane intersects the first linking member when the chain guide is located at the first lateral position.

96. The derailleur according to claim 95 wherein the pulley plane intersects the second linking member when the chain guide is located at the first lateral position.

97. The derailleur according to claim 96 wherein the first lateral position is a laterally outermost position of the chain guide.

98. The derailleur according to claim 92 wherein the pulley plane intersects a space between the first linking member and the second linking member when the chain guide is located at the first position.

99. The derailleur according to claim 98 wherein a movable member plane intersects an innermost surface of the movable member and is oriented substantially parallel to the pulley plane, and wherein at least a portion of a space between the pulley plane and the movable member plane intersects the space between the first linking member and the second linking member.

100. The derailleur according to claim 99 wherein the movable member plane intersects at least one of the first linking member or the second linking member when the chain guide is located at the first position.

101. The derailleur according to claim 100 further comprising a biasing member that biases the chain guide so that the chain guide is set at the first lateral position, wherein the movable member plane intersects the first linking member when the chain guide is located at the first lateral position.

102. The derailleur according to claim 101 wherein the first lateral position is a laterally outermost position of the chain guide.

103. The derailleur according to claim 102 wherein the movable member plane intersects the second linking member when the chain guide is located at the first lateral position.

104. The derailleur according to claim 99 wherein the movable member plane intersects the space between the first linking member and the second linking member when the chain guide is located at the first position.

105. The derailleur according to claim 104 further comprising a biasing member that biases the chain guide so that the chain guide is set at the first lateral position, wherein the movable member plane intersects the first linking member when the chain guide is located at the first lateral position.

106. The derailleur according to claim 105 wherein the first lateral position is a laterally outermost position of the chain guide.

107. The derailleur according to claim 83 wherein the pulley plane intersects the base member when the chain guide is located at the first position.

108. The derailleur according to claim 107 wherein the first position is a laterally outermost position.

109. The derailleur according to claim 83 wherein the first pivot axis extends across all components at the coupling of the first linking member and the base member, wherein the first linking member is coupled to the movable member for pivoting around a second pivot axis that extends across all components at the coupling of the first linking member and the movable member, and wherein the pulley plane intersects at least one of the first pivot axis or the second pivot axis when the chain guide is located at a first position between the first lateral position and the second lateral position.

110. The derailleur according to claim 109 further comprising a biasing member that biases the chain guide so that the chain guide is set at the first lateral position, wherein the pulley plane intersects the at least one of the first pivot axis or the second pivot axis when the chain guide is located at the first lateral position.

111. The derailleur according to claim 110 wherein the first lateral position is a laterally outermost position of the chain guide.

112. The derailleur according to claim 111 wherein the pulley plane intersects the first pivot axis when the chain guide is located at the first lateral position.

113. The derailleur according to claim 109 wherein a movable member plane intersects an innermost surface of the movable member and is oriented substantially parallel to the pulley plane, and wherein the movable member plane intersects at least one of the first pivot axis or the second pivot axis when the chain guide is located at the first lateral position.

114. The derailleur according to claim 113 further comprising a biasing member that biases the movable member so that the chain guide is set at the first lateral position, wherein the movable member plane intersects the at least one of the first pivot axis or the second pivot axis when the chain guide is located at the first lateral position.

115. The derailleur according to claim 114 wherein the first lateral position is a laterally outermost position of the chain guide.

116. The derailleur according to claim 115 wherein the movable member plane intersects the second pivot axis when the chain guide is located at the first lateral position.

117. The derailleur according to claim 113 wherein the movable member plane intersects the first pivot axis when the chain guide is located at the first lateral position.

118. The derailleur according to claim 109 wherein at least a portion of the first pivot axis is disposed on a laterally inner side of the pulley plane, and wherein at least a portion of the second pivot axis is disposed on a laterally outer side of the pulley plane.

119. The derailleur according to claim 118 wherein the second pivot axis is disposed entirely on the laterally outer side of the pulley plane.

* * * * *